July 15, 1930.  L. H. MILES  1,770,796
FLUID BRAKE
Filed June 9, 1926  2 Sheets-Sheet 1
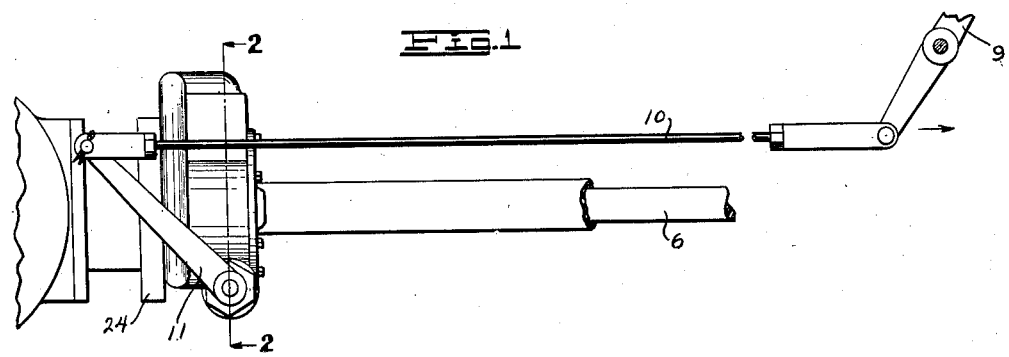
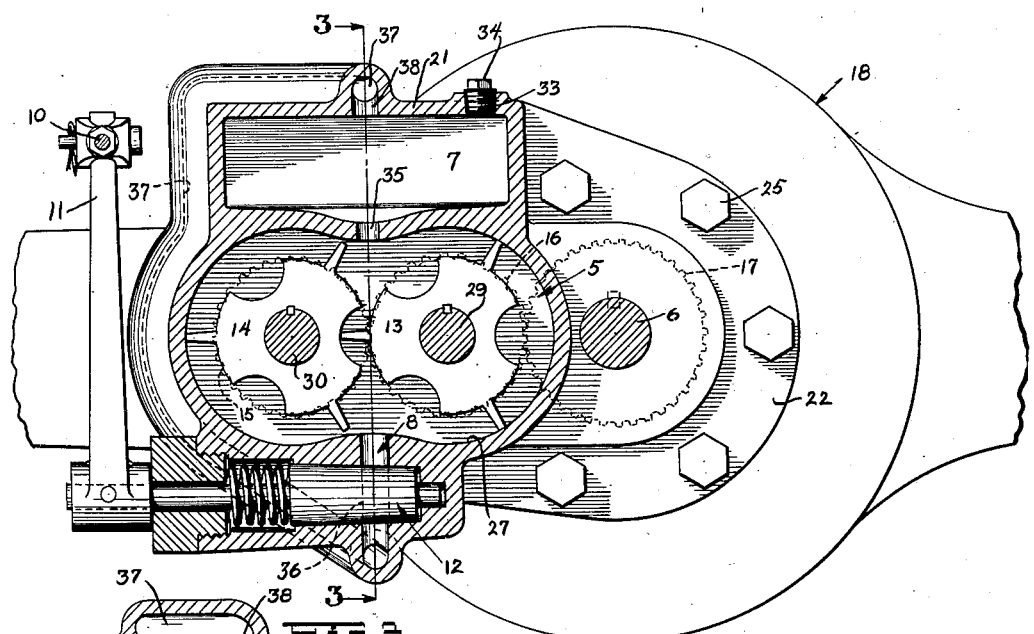
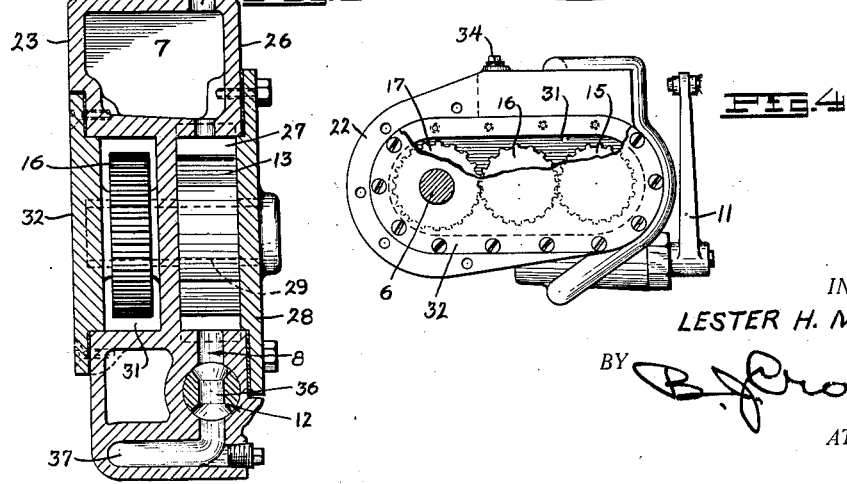
INVENTOR.
LESTER H. MILES
BY
ATTORNEY.

July 15, 1930. L. H. MILES 1,770,796
FLUID BRAKE
Filed June 9, 1926 2 Sheets-Sheet 2

INVENTOR.
LESTER H. MILES
BY
ATTORNEY.

Patented July 15, 1930

1,770,796

UNITED STATES PATENT OFFICE

LESTER H. MILES, OF LOS ANGELES, CALIFORNIA

FLUID BRAKE

Application filed June 9, 1926. Serial No. 114,622.

This invention relates to fluid brakes.

The general object of my invention is to provide an improved type of safety brake particularly adapted for motor driven vehicles in connection with which it will be described hereinafter, but it may be applied to any rotating shaft which is at times desirable to stop or slow down.

A specific object of my invention is to provide a brake mechanism which will act equally on both rear wheels of the vehicle and which will dispense with the usual brake lining, which in case of excessive mountain driving wherein many long and steep down grades are encountered will invariably burn out and leave the vehicle in a condition dangerous to operate.

Another object of my invention is to provide an improved hydraulic brake which is operated by a fluid pump.

Other objects of the invention will be apparent from the following description taken in connection with the accompanying drawings, wherein:

Fig. 1 is a fragmentary elevation showing my fluid brake and the associated operating parts;

Fig. 2 is a section on line 2—2, Fig. 1;

Fig. 3 is a section on line 3—3, Fig. 2;

Fig. 4 is a section partly in section showing the driving gears;

Figure 5:
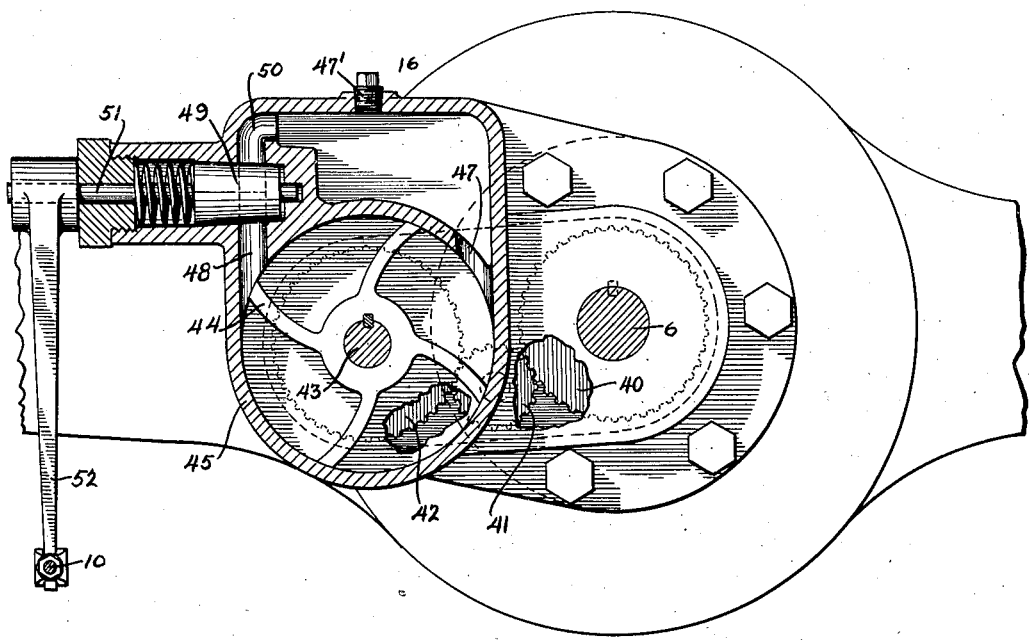
Fig. 5 is a cross sectional view partly in elevation showing a modification.
Figure 6:
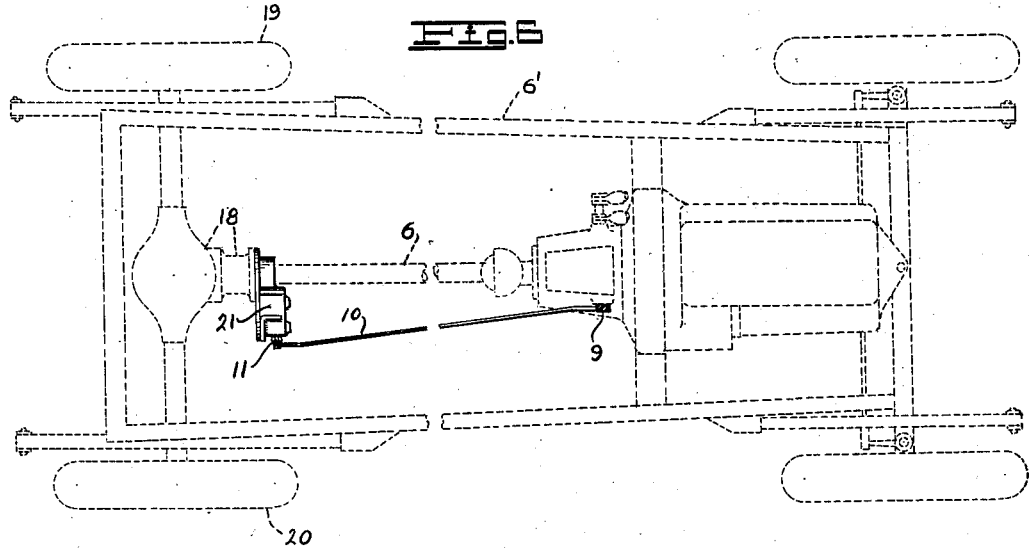
Fig. 6 is a diagrammatic view showing the arrangement of my brake on an automobile.

Referring to the drawing by reference characters, I have shown my invention as consisting of a pump 5 geared to the propeller shaft 6 of a vehicle 6' which has a gear shifting device and normally pumping oil from a reservoir 7 through a valve controlled passage 8 back into the reservoir 7 without offering any impeding force to the movement of the propeller shaft.

When it is desired to retard the speed of the vehicle the operator may first put the vehicle in neutral and then move the hand lever 9 in the direction of the arrow (Fig. 1) which through the medium of a brake rod 10 and valve arm 11 rotates the valve 12 to restrict the passage 8, whereupon the smaller opening for the passage of oil will cause a slowing up of the rotors 13 and 14. The rotors 13 and 14 are driven through gears 15, 16 and 17 and as the speed of the rotors is reduced the propeller shaft is slowed down. The propeller shaft, the housing of which is indicated at 18 in turn slows down the speed of the rear wheels 19 and 20 of the vehicle.

As shown my braking mechanism consists of a housing 21 provided on one side with a flange 22 which is a continuation of the rear wall 23. This flange 22 is shown as secured to a flange 24 on the differential housing 18 by bolts 25. In a recess in the front face 26 of the housing 18, I provide a pump chamber 27 which has a cover plate 28. The cover plate includes bearings 28' for the shafts 29 and 30 to which the pump rotor members 13 and 14 are keyed. The rear wall of the chamber 27 also serves as a bearing for the shafts 29 and 30 which pass therethrough. These shafts have gears 15 and 16 keyed thereon. These gears are in a chamber 31 which has a cover plate 32 provided with bearings for the ends of the shafts 29 and 30.

The chamber 31 is elongated to accommodate the gear 17 which is on the propeller shaft 6.

The pump rotor members 13 and 14 are rotated by means of shafts 29 and 30 which are rotated by gears 15 and 16 which in turn are driven by a gear 17 on the propeller shaft 6.

Above the chambers 27 and 31 I provide a reservoir in the top of which is a filling aperture 33 which is closed by a threaded plug 34 and in the bottom of the reservoir, I provide a passage 35 to a pump chamber 27, through which the oil is drawn by the pump 5 and forced through passage 8 in the bottom wall of the chamber 27, through passage 36 in the valve 12, through return passage 37 and back into the reservoir 7 through passage 38 provided in the top wall thereof.

In Fig. 5 I have shown the shaft 6 as provided with a gear 40 which meshes with a gear 41 which drives a gear 42 mounted on a shaft 43. On this shaft 43 is a rotary pump member including vanes 44 which work within a casing 45. The fluid reservoir is shown at 46 which has a filling aperture which may be closed by a plug 47', and is driven by the vanes 44 to and through an aperture 48, past the valve 49 to the passage 50, back to the reservoir. The valve 49 is mounted on a shaft 51 and is controlled by an arm 52 which may be connected to a brake rod 10 such as previously described. The operation of this modification is substantially the same as the operation of the mechanism first described and a repetition thereof, is believed to be unnecessary.

In operation, the pump normally acts to draw fluid from the reservoir forcing it through the pump by the valve and back to the reservoir. When the operator wishes to use my improved brake, he will cause actuation of the brake rod 10 thereby moving the valve and impeding the flow of oil through the circulation system. This impeding action will cause the drive shaft to do more work and consequently will produce the braking effect.

Having thus described my invention, I claim:

1. In combination with an automobile including a drive shaft, a housing, a recess in said housing and a closure for said recess, a gear pump in said recess comprising two fluid propelling rotatable elements each mounted on individual shafts, a gear on each of said shafts in mesh with one another and gear means connecting one of said gears to said drive shaft whereby when said drive shaft rotates said fluid propelling elements will be rotated, a fluid reservoir above said recess, a filler aperture in said reservoir and a closure plug for said aperture, a passageway in the bottom of said reservoir communicating with said recess and another passageway leading from said recess and entering said reservoir adjacent the top thereof, whereby when said fluid propelling elements are rotated fluid will be drawn from said reservoir through said first mentioned passageway into said recess and forced out of said recess through said second mentioned passageway and returned to said reservoir, a draining aperture in said second mentioned passageway and a closure plug for said aperture, valve means in said second mentioned passageway for controlling the passage of fluid therethrough, a lever associated with said valve means for actuating the same and means connecting said lever to means associated with said automobile for rocking said lever to actuate said valve means.

2. In combination with an automobile including a drive shaft and a differential housing, a one piece housing, said housing being removably secured to said differential housing, a recess in said housing and a closure for said recess, a gear pump in said recess comprising two fluid propelling rotatable elements each mounted on individual shafts, a gear on each of said shafts in mesh with one another and gear means connecting one of said gears to said drive shaft whereby when said drive shaft rotates said fluid propelling elements will be rotated, said gears being contained in said housing in a compartment partitioned from said previously mentioned recess, a closure for said compartment, a fluid reservoir adjacent to said recess, a filling aperture in said reservoir and a closure for said aperture, a passageway in the bottom of said reservoir communicating with said recess and another passageway leading from said recess and entering said reservoir adjacent the top thereof, whereby when said fluid propelling elements are rotated fluid will be drawn from said reservoir through said first mentioned passageway into said recess and forced out of said recess through said second mentioned passageway and returned to said reservoir, a draining aperture in said second mentioned passageway and a closure for said aperture, valve means in said second mentioned passageway for controlling the passage of fluid therethrough, a lever associated with said valve means for actuating the same and means connecting said lever to means associated with said automobile for rocking said lever to actuate said valve means.

In testimony whereof, I hereunto affix my signature.

LESTER H. MILES.